US012802451B2

(12) United States Patent
Doyon et al.

(10) Patent No.: US 12,802,451 B2
(45) Date of Patent: Nov. 17, 2026

(54) METHOD FOR CONFIGURING A VIDEO SURVEILLANCE SYSTEM

(71) Applicant: GENETEC INC., St-Laurent (CA)

(72) Inventors: Jonathan Doyon, Saint-Laurent (CA); Mortimer Hubin, Laval (CA); Florian Matusek, Vienna (AT); Georg Zankl, Vienna (AT)

( * ) Notice: Subject to any disclaimer, the term of this patent is extended or adjusted under 35 U.S.C. 154(b) by 187 days.

(21) Appl. No.: 18/932,925

(22) Filed: Oct. 31, 2024

(65) Prior Publication Data

US 2026/0120468 A1 Apr. 30, 2026

(51) Int. Cl.

| | |
|---|---|
| ***G06K 9/00*** | (2022.01) |
| ***G06T 3/40*** | (2006.01) |
| ***G06T 7/20*** | (2017.01) |
| ***G06T 7/70*** | (2017.01) |
| ***G06V 10/44*** | (2022.01) |
| ***G06V 20/52*** | (2022.01) |

(Continued)

(52) U.S. Cl.

CPC ................ *G06V 20/52* (2022.01); *G06T 3/40* (2013.01); *G06T 7/20* (2013.01); *G06T 7/70* (2017.01); *G06V 10/44* (2022.01); *H04N 23/61* (2023.01); *H04N 23/631* (2023.01); *G06V 2201/07* (2022.01)

(58) Field of Classification Search

CPC .... G06V 20/52; G06V 10/44; G06V 2201/07; G06T 7/70; G06T 3/40; G06T 7/20; H04N 23/61; H04N 23/631

See application file for complete search history.

(56) References Cited

U.S. PATENT DOCUMENTS

| | | | |
|---|---|---|---|
| 7,450,735 | B1 | 11/2008 | Shah et al. |
| 8,300,102 | B2 | 10/2012 | Nam et al. |

(Continued)

FOREIGN PATENT DOCUMENTS

| | | | |
|---|---|---|---|
| CN | 102436662 | A | 5/2012 |
| CN | 103632044 | A | 3/2014 |

(Continued)

OTHER PUBLICATIONS

Narayan, Neeti, et al. "Person re-identification for improved multi-person multi-camera tracking by continuous entity association." Proceedings of the IEEE Conference on Computer Vision and Pattern Recognition Workshops. 2017. (Year: 2017).*

(Continued)

*Primary Examiner* — Avinash Yentrapati
(74) *Attorney, Agent, or Firm* — Anglehart et al.

(57) ABSTRACT

A graphical user interface to be displayed on a computing device associated with a video surveillance system is automatically configured to create links between cameras of the video surveillance system. An association between nearby cameras is obtained by identifying an object in a video feed of one of the cameras, and re-identifying the same object in another video feed of another one of the cameras. If the re-identification of the object takes place within a predetermined time period, it can be assumed that the object has moved from the field of view of the first camera into the field of view of the other camera. As a result, a user interface element resulting in a switch from the video feed of the first camera to the video feed of the other camera is configured to be superimposed on the video from the first camera.

22 Claims, 4 Drawing Sheets

(51) Int. Cl.

| | |
|---|---|
| ***H04N 23/61*** | (2023.01) |
| ***H04N 23/63*** | (2023.01) |

(56) References Cited

U.S. PATENT DOCUMENTS

| | | | |
|---|---|---|---|
| 8,760,521 | B2 | 6/2014 | Medeiros et al. |
| 9,280,833 | B2 | 3/2016 | Brown et al. |
| 9,449,233 | B2 | 9/2016 | Taylor |
| 9,791,264 | B2 | 10/2017 | Liu et al. |
| 10,406,645 | B2 | 9/2019 | Lee et al. |
| 10,713,913 | B2 | 7/2020 | Ouedraogo et al. |
| 11,019,268 | B2 * | 5/2021 | Ida ................... G08B 13/19608 |
| 11,106,919 | B1 * | 8/2021 | Balogh ................ G06V 10/454 |
| 11,126,863 | B2 | 9/2021 | Marano et al. |
| 11,315,262 | B1 | 4/2022 | Cherevatsky et al. |
| 11,620,900 | B2 | 4/2023 | Oliver et al. |
| 11,948,313 | B2 | 4/2024 | Fisher |
| 2013/0147961 | A1 | 6/2013 | Gao et al. |
| 2014/0050455 | A1 * | 2/2014 | Ni .......................... H04N 7/181 386/E5.028 |
| 2019/0188866 | A1 | 6/2019 | Mehrseresht |
| 2019/0385173 | A1 * | 12/2019 | Johnsen ............... G06Q 30/016 |
| 2020/0175697 | A1 | 6/2020 | Jeon et al. |
| 2020/0402259 | A1 | 12/2020 | Liu |
| 2021/0321063 | A1 | 10/2021 | Abramov |
| 2022/0335726 | A1 | 10/2022 | Paverman Kashani et al. |
| 2023/0088414 | A1 * | 3/2023 | Toni ....................... G06N 20/00 382/103 |
| 2023/0326075 | A1 | 10/2023 | Luo et al. |
| 2023/0394686 | A1 | 12/2023 | Min et al. |
| 2024/0062395 | A1 | 2/2024 | Robinson et al. |
| 2024/0070897 | A1 * | 2/2024 | Thomasson ............... G06T 7/60 |
| 2024/0119737 | A1 * | 4/2024 | Li ............................ G06N 5/02 |
| 2024/0212027 | A1 * | 6/2024 | Woollard ............... G06V 20/52 |

FOREIGN PATENT DOCUMENTS

| | | | |
|---|---|---|---|
| CN | 104717468 | A | 6/2015 |
| CN | 106295594 | A | 1/2017 |
| CN | 112348856 | A | 2/2021 |
| CN | 112884815 | A | 6/2021 |
| CN | 116342662 | A | 6/2023 |
| WO | 2023/210839 | A1 | 11/2023 |

OTHER PUBLICATIONS

Corresponding European patent application No. 25211296.6 extended European search report dated Mar. 9, 2026.

* cited by examiner

METHOD FOR CONFIGURING A VIDEO SURVEILLANCE SYSTEM

FIELD

The present disclosure relates generally to the field of video surveillance, and, more particularly, to a method for configuring a video surveillance system.

BACKGROUND

A video surveillance environment may have a number of cameras connected to a server for the purpose of transmitting video data to the server. The server may archive the video data, manage and control the cameras, provide a workstation environment, for example, for a live view of the camera video feeds, and/or provide access to camera video feeds by remote workstations. Typically, a so-called video management system (VMS), which is a software component running on the server, provides the aforementioned functions of the server.

In a complex video surveillance environment, where numerous cameras are deployed, it may be difficult for an operator to quickly identify a camera that he/she wishes to select in order to display the video feed of said camera. This may be the case in buildings with similar looking areas (e.g., corridors, conference rooms, etc.), or when multiple cameras are installed in a same room. When trying to identify a camera among a plurality of cameras, the operator may rely on naming conventions and/or logical organization from the VMS. However, when such a configuration is deficient, or when the operator is not familiar with the naming convention, it might be time consuming for the operator to identify a camera. The operator might have to manually look at a large number of potential video feeds and look for visual cues to identify the camera.

A user may connect to the server with a desktop application to view the video feeds, for example, when the server is an on-premises server. For example, a user may use the Genetec® Security Desk application to connect to a server running the Genetec® Security Center unified security platform. Similarly, a user may connect to the server with a web application or a web browser, for example, when the server is a cloud computing environment.

Against this background, there remains a need to provide improvement to existing systems that provides an improved display of information while allowing for an efficient configuration of the video surveillance system.

SUMMARY

The following presents a simplified summary of one or more implementations in accordance with the aspects of the present disclosure in order to provide a basic understanding of such implementations.

The disclosure describes various examples of automatically generating one or more user interface elements that can be superimposed on a display area of a video feed (also referred to as video stream) from a camera and, upon selection of a user interface element, result in the display of a video feed from another camera in the display area. In one example, a first camera may display a certain area of the video surveillance environment, for example, an entrance to a building. When a visitor enters the entrance to the building, the user can be seen by security personnel watching the video from the first camera. However, once the visitor leaves the field of view of the first camera, the visitor can no longer be observed by the security personnel. Therefore, it is necessary to switch the display to a video feed from another camera. Here, by an appropriate configuration of a user interface element superimposed on the video from the first camera, the operator of the system can click on or otherwise activate the user interface element in order to immediately switch to the view from the other camera. Advantageously, the other camera has a field of view that the visitor enters after leaving the field of view of the first camera. This allows for a seamless and easy tracking of a visitor, or any other person or object that is present in the video surveillance environment.

The present disclosure describes, in one or more exemplary implementations, a method for automatically configuring a video surveillance system, more particularly, automatically associating one or more additional cameras with a first camera having a first field of view. The fields of view of the additional cameras may overlap or be adjacent to the field of view of the first camera, such that selection of one or more of the additional cameras allows for tracking of objects or persons without having to manually select the correct further camera, for example, from a drop-down list or the like. Advantageously, in some exemplary implementations, the user interface element associated with the further camera is arranged in the display area of the video captured by the first camera such that it gives an indication of the position and/or arrangement of the further camera. For example, when the further camera is positioned such that it can capture an object or person that is leaving the field of view of the first camera on the left side, the user interface element associated with the further camera may be displayed in proximity to the left boundary of the display area showing the video from the first camera. In this manner, an operator can intuitively select the correct camera to keep track of the object or person.

In accordance with one aspect, there is provided a computer-implemented method for configuring a video surveillance system. The method includes, at a computing device associated with the video surveillance system, identifying a first object in a first video feed captured by a first camera of a plurality of cameras of the video surveillance system, determining a first time at which the first object is captured by the first camera, determining whether the first object can be re-identified in a second video feed captured by a second camera of the plurality of cameras within a predetermined time period from the first time, when the first object is re-identified in the second video feed within the predetermined time period, associating the second camera with the first camera as an associated camera, generating first configuration settings specifying first attributes of a first user interface element configured to be displayed in a display area of a graphical user interface when the display area displays video from the first camera, the first attributes including a position of the first user interface element in the display area and a reference to the associated camera, and storing the first configuration settings in a memory.

In some embodiments, the method further includes, at the computing device associated with the video surveillance system, obtaining location information identifying locations of the plurality of cameras of the video surveillance system, determining a number of candidate cameras in proximity to the first camera based on the location information, and determining whether the first object can be re-identified in one of a plurality of candidate video feeds captured by the candidate cameras within the predetermined time period from the first time.

In some embodiments, the method further includes, by the computing device and in response to identifying the first object in the first video feed, obtaining the plurality of candidate video feeds, and performing image recognition on the plurality of candidate video feeds to re-identify the first object.

In some embodiments, the plurality of candidate video feeds are received and processed by the computing device in real time.

In some embodiments, the method further includes, at the computing device associated with the video surveillance system, obtaining a first feature vector characterizing the first object, the first feature vector being associated with the first time, comparing the first feature vector to at least one second feature vector associated with a second video feed, and determining that the first object is re-identified in the second video feed when the at least one second feature vector matches the first feature vector and is associated with a second time within the predetermined time period.

In some embodiments, the method further includes, by the computing device, retrieving the first feature vector and the at least one second feature vector from a database of feature vectors generated in advance.

In some embodiments, the database is continually updated during operation of the video surveillance system.

In some embodiments, the method further includes specifying characteristics of the first feature vector, and selecting the first feature vector to be used for the comparison based on the specified characteristics.

In some embodiments, the method further includes performing image processing on the first video feed prior to generating the first feature vector for the first object.

In some embodiments, the image processing includes at least one of selecting a specific frame of the first video feed, extracting a portion of a frame of the first video feed including the first object, and enlarging the portion of the frame of the first video feed including the first object.

In some embodiments, the first feature vector and/or the at least one second feature vector are generated by the first camera and the second camera, respectively.

In some embodiments, the method further includes generating, by the computing device, second configuration settings specifying second attributes of a second user interface element configured to be displayed in a display area of the graphical user interface when the display area displays video from the associated camera. The second attributes include a position of the second user interface element in the display area and a reference to the first camera. The method further includes storing the second configuration settings in the memory.

In some embodiments, the method further comprises, at the computing device, obtaining at least one motion vector characterizing a movement of the object from at least one of the first video feed and the video feed captured by the associated camera, and determining the position of the first user interface element and/or the second user interface element based at least in part on the at least one motion vector.

In some embodiments, the at least one motion vector specifies a speed of movement and/or a direction of movement of the object entering or exiting a field of view of the first camera, and/or a speed of movement and/or a direction of movement of the object entering or exiting a field of view of the associated camera.

In some embodiments, the method further includes determining the direction of movement of the object from a still frame of the first video feed including the object.

In some embodiments, the method further includes determining, by the computing device, a positional relationship between the field of view of the first camera and a field of view of the associated camera based at least in part on the at least one motion vector.

In some embodiments, the at least one motion vector is determined by at least one of the first camera and the associated camera. The method further includes receiving, at the computing device, the at least one motion vector from the at least one of the first camera and the associated camera.

In some embodiments, the method further includes, by the computing device, determining at least one of a position of the first object in an image captured by the first camera and a movement path of the first object in the first video feed, and determining the position of the first user interface element based at least in part on the position and/or the movement path of the first object.

In some embodiments, the method further includes determining, by the computing device, a positional relationship between the first camera and the associated camera based on the location information, wherein the position of the first user interface element and/or the position of the second user interface element is determined based at least in part on the positional relationship.

In some embodiments, the method further includes determining, by the computing device and based at least in part on the location information, whether one or more doorways are present between the location of the first camera and the location of the associated camera, and specifying a shape of the first user interface element as part of the first attributes in accordance with the determination.

In some embodiments, the method further includes determining, by the computing device, a time interval between the identification of the object in the first video feed and the re-identification of the object in the video feed captured by the associated camera, and generating the first configuration settings based at least in part on the time interval.

In some embodiments, the first attributes include at least one of a size and a distance from a boundary of the display area of the first user interface element, which size and distance are determined based at least in part on the time interval.

In some embodiments, the method further includes, at a client device displaying video from the first camera in the display area of the graphical user interface, prompting a user to confirm whether the first user interface element is to be displayed in the display area, and storing a result of the confirmation.

In some embodiments, the method further includes adjusting, by a client device displaying the graphical user interface, at least the position of the first user interface element in the display area in response to a user input, and storing the adjusted position as part of the first configuration settings.

In some embodiments, the first attributes include an opacity of the first user interface element. The method further includes adjusting the opacity of the first user interface element displayed in a display area in response to a user input.

In some embodiments, the method further includes determining, by the computing device, a position of at least one further user interface element configured to be displayed in the display area when the display area displays video from the first camera, and specifying the position of the first user interface element such that the first user interface element does not overlap the at least one further user interface element.

In some embodiments, the method further includes determining attributes of the at least one further user interface element, and specifying the position of the first user interface element such that the first user interface element is positioned adjacent to the at least one further user interface element in case there is at least a partial match between additional attributes included in the first attributes and additional attributes included in the attributes of the at least one further user interface element. The additional attributes include one or more of: a distance to the first camera; a location of the associated camera; information as to whether the associated camera is an indoor or an outdoor camera; a background in the video feed captured by the associated camera.

In some embodiments, the location information is topological information specifying a logical and/or geographical distribution, scale and connection of spaces and/or locations.

In some embodiments, identifying and re-identifying the first object is performed using a machine learning model.

In accordance with another aspect, there is provided a surveillance system comprising a plurality of cameras, a computing device including at least one processor, and a memory having stored thereon program instructions executable by the at least one processor for: identifying a first object in a first video feed captured by a first camera of the plurality of cameras; determining a first time at which the first object is captured by the first camera; determining whether the first object can be re-identified in a second video feed captured by a second camera of the plurality of cameras within a predetermined time period from the first time; when the first object is re-identified in the second video feed within the predetermined time period, associating the second camera with the first camera as an associated camera; generating first configuration settings specifying first attributes of a first user interface element configured to be displayed in a display area of a graphical user interface when the display area displays video from the first camera, the first attributes including a position of the first user interface element in the display area and a reference to the associated camera; and storing the first configuration settings in the memory.

In some embodiments, the computing device is a central computing device, and the system further comprises at least one client device in communication with the memory and configured to display video from the first camera in the display area in accordance with the first configuration settings.

In some embodiments, the program instructions are executable by the at least one processor for determining a presence of a new camera added to the plurality of cameras and, in response to the determination, one of: executing the program instructions of the above aspect to reconfigure the system; and outputting a notification indicating that a reconfiguration of the system should be performed.

In some embodiments, the surveillance system is part of an access control system controlling access to at least one facility.

In some embodiments, a graphical user interface to be displayed on a computing device associated with a video surveillance system is automatically configured to create links between cameras of the video surveillance system. An association between nearby cameras is obtained by identifying an object in a video feed of one of the cameras, and re-identifying the same object in another video feed of another one of the cameras. If the re-identification of the object takes place within a predetermined time period, it can be assumed that the object has moved from the field of view of the first camera into the field of view of the other camera. As a result, a user interface element resulting in a switch from the video feed of the first camera to the video feed of the other camera is configured to be superimposed on the video from the first camera.

Any of the above features may be used together in any suitable combination. Further features and combinations thereof concerning embodiments described herein will be apparent to those skilled in the art from the following description.

DESCRIPTION OF THE DRAWINGS

Reference is made to the accompanying figures in which.

In the appended drawings, like features are identified by like reference numerals.

DETAILED DESCRIPTION

Figure 1:
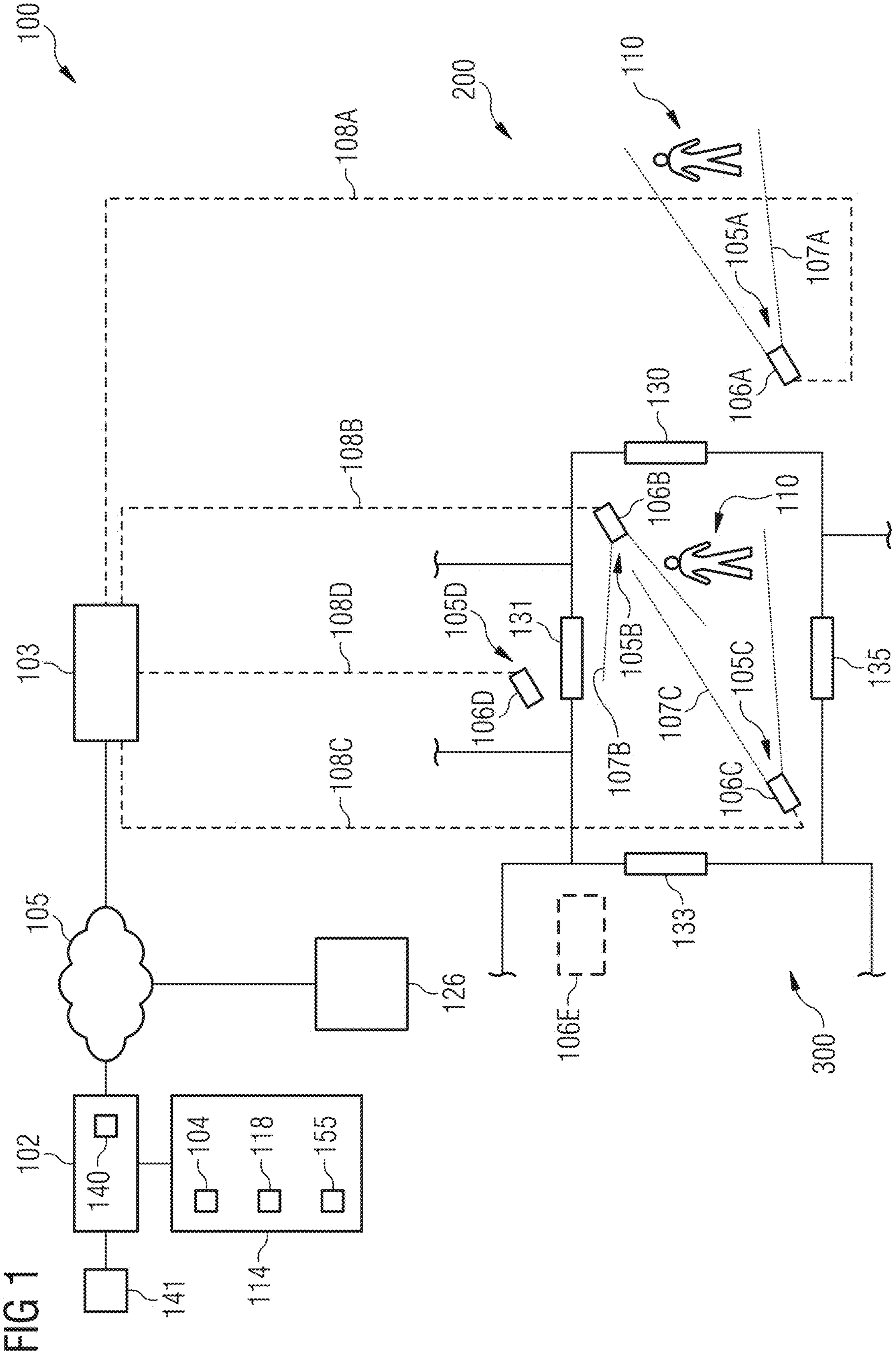
FIG. 1 is a schematic overview of an exemplary video surveillance environment, in accordance with one or more embodiments.

Referring to FIG. 1, there is illustrated an example of a video surveillance system 100. The video surveillance system 100 includes at least one server 102 and a plurality of cameras (more particularly, video cameras) 106A, . . . , 106D in communication with the server 102. While FIG. 1 shows four cameras 106A, 106B, 106C, 106D, this is for illustrative purposes only, and any suitable number of video cameras may be installed in the video surveillance system 100 and be in communication with the server 102.

Each camera may be any suitable camera for capturing images. The cameras 106A, . . . , 106D in the video surveillance system 100 may comprise different types of cameras, different models of cameras, and/or may comprise cameras from different manufacturers. In general, a given camera comprises at least one image sensor (also referred to as an optical sensor). The image sensor, for example, may be in the form of a charge coupled device (CCD), a complementary metal-oxide-semiconductor (CMOS) sensor or any other suitable sensor for registering incident light. The camera may comprise a lens for collecting incident light. In some embodiments, the image sensor comprises an infrared image sensor. The camera may comprise multiple image sensors. For example, the camera may comprise an image sensor for capturing color images and an image sensor for capturing infrared images. In some embodiments, the camera is an infrared camera. The camera may comprise one or more processors and/or other suitable circuitry. For example, a camera may comprise an image/video encoder (implemented in hardware, software, or any combination thereof), a processing unit, a memory, and/or a network interface for connection to one or more networks, such as a network 105. The cameras 106A-106D may be connected to the network 105 via a router 103.

The encoder of each camera may be arranged to encode captured digital image data into any one of several formats for continuous video sequences, for limited video sequences, for still images or for streamed images/video. For instance, the image information may be encoded into MPEG1, MPEG2, MPEG4, H.264, H.265, AV1, JPEG, M-JPEG, Bitmaps or any other suitable format. Accordingly, each camera is configured to obtain one or more images based on image information captured by the image sensor. Each camera is configured to transmit video data comprising the one or more captured images to the server 102 as a corresponding video feed 108A, . . . , 108D. In some embodiments, the video data may be transmitted in real-time or near real-time from the cameras 106A . . . , 106D to the server 102. In some embodiments, the video data may be stored at a storage device of a given camera, or at a storage device connected to a given camera. The video data stored at a given camera may be provided to the server 102 at a later time. The video data comprising a plurality of images from a given camera may be referred to as a video feed or video stream. Accordingly, each one of the video cameras 106A, . . . 106D may provide at least one respective video feed to the server 102. An image or images of a given video feed may be referred to as a "frame" or as "frames", respectively. In other words, a video feed may be referred to as comprising a plurality of frames. In some embodiments, one or more of the cameras 106A, . . . , 106D may provide multiple video feeds to the server 102, depending on the configurations of the cameras. The configuration and/or the components of each one of the plurality of cameras 106A, . . . , 106D may vary.

The server 102 may be any suitable computing device, such as one or more computers, a server cluster, a main frame, a computing cluster, a cloud computing system, a distributed computing system, a portable computing device, or the like. While reference is made herein to "a server" or to "the server", it should be understood that one or more servers may be used to implement the embodiments and/or examples described herein. The server 102 may be a back-end server. The server 102 is configured to receive video data from the video cameras 106A, . . . , 106D connected to the server 102. The video data from a given video camera corresponds to at least one video feed of images captured by that video camera. The video cameras may communicate with the server 102 by use of one or more wires, such as one or more network cables, by use of any suitable network equipment and/or by wireless communication. The cameras 106A, . . . , 106D may communicate with the server 102 using one or more networks. The network(s) may comprise one or more public networks (e.g., the Internet) and/or one or more private networks. The network(s) may comprise one or more of a personal area network (PAN), a local area network (LAN), a mesh network, a metropolitan area network (MAN), a wide area network (WAN), a wireless network, a WiFi network, a cellular network and/or any other suitable network(s).

The server 102 may be or may comprise an archiver for archiving the video data. The server 102 may manage the cameras 106A, . . . , 106D, provide a workstation environment, for example, for live view of the video feeds or for managing the cameras 106A, . . . , 106D, and/or provide or control access to camera feeds by remote workstation(s), such as an exemplary client device 126. The server 102 may provide a video management system (VMS), which may provide any of the described functions of the server 102. The VMS may be a software application running on the server 102, which provides video management services. The VMS may receive the video data from the plurality of cameras 106A, . . . , 106D, may store the video data to a storage device, for example, a memory 114 in communication with the server 102, and/or provide an interface to both view a live video feed produced by the video data of a given camera, and access stored video data. The VMS may be implemented, for example, by the Security Center software of Genetec Inc. In some embodiments, the VMS is at least one separate computing device connected to the server 102, such as one or more computers, a server cluster, a main frame, a computing cluster, a cloud computing system, a distributed computing system, a portable computing device, or the like. The memory 114 may be any type of memory with any suitable configuration, and is not limited to a single physical storage device, but can include a plurality of storage devices, which may be present in different locations and associated with different data processing devices, for example, in a cloud storage environment or other network computing systems.

One or more client devices, such as the client device 126 of FIG. 1, may be configured to interact with the video surveillance system 100 via the server 102. The client device 126 may be able to connect to the server 102, for example, via the network 105, in order to view one or more live video feeds provided by the cameras 106A, . . . , 106D and/or to access stored video feeds. The client device 126 may be any suitable computing device, for example, a portable computing device such as a mobile phone, a smartphone, a tablet, a laptop computer, or another computing device such as known desktop computing devices. The client device 126 may run an application configured to allow the client device 126 to communicate with the server 102. The client device 126 may have any suitable network interface for connecting to a network, such as the network 105. The client device 126 may communicate with the server 102 by use of one or more wires, such as one or more network cables, by use of any suitable network equipment, and/or by wireless communication. When the expression "computing device associated with the video surveillance system" is used herein, it is to be understood as referring to at least one of the server 102 and a client device connected to the server. In other words, any method steps or functions performed by the "computing device associated with the video surveillance system" can be performed by the server 102 and/or the client device 126. In some cases, in particular when a client device 126 is used to perform the generation of the configuration settings 118, video from suitable past time periods, rather than live video feeds, can be retrieved from server 102 and analyzed to generate the configuration settings. In the case that the configuration settings are determined externally from memory 114, they may be sent to the server 102 for storage in memory 114 or the configuration settings may be served from the client device 126 to other client devices that requires the configuration settings.

The server 102 may comprise one or more network interfaces for communicating with the plurality of cameras 106A, . . . , 106D and/or the client device 126. The network interfaces may be implemented in hardware, software, or a combination thereof. In some embodiments, the network interface for the plurality of cameras 106A, . . . , 106D is separate from the network interface for the client device 126.

In the example shown in FIG. 1, the surveillance system 100 is associated with an access control system 200 controlling access to at least one facility 300. Although the exemplary video surveillance system 100 is described as being associated with the access control system 200, it will be appreciated that, in other embodiments, the video surveillance system 100 may not be associated with an access control system, and may be used for monitoring the at least one facility 300 only. The facility 300 may be any one of a building complex, an office building, a manufacturing site, or a distributed facility including buildings at different geographical locations. The plurality of cameras 106A, . . . , 106D are installed at appropriate locations in the video surveillance system 100, more particularly, the at least one facility 300. Each of the plurality of cameras 106A, . . . , 106D has an associated field of view 107A, . . . , 107D, which is an area in the video surveillance system 300 captured by the corresponding camera, i.e., visible in the images and video feeds produced by the respective camera. In the example shown in FIG. 1, a first camera 106A may be installed outside an entrance 130 of a building of the at least one facility 300. A second camera 106B and a third camera 106C may be installed at opposite corners in an entrance hall of the building. A plurality of doors 131, 133, 135 may provide exits from the entrance hall of the building, and may lead to other rooms or corridors inside the building.

Figure 3:
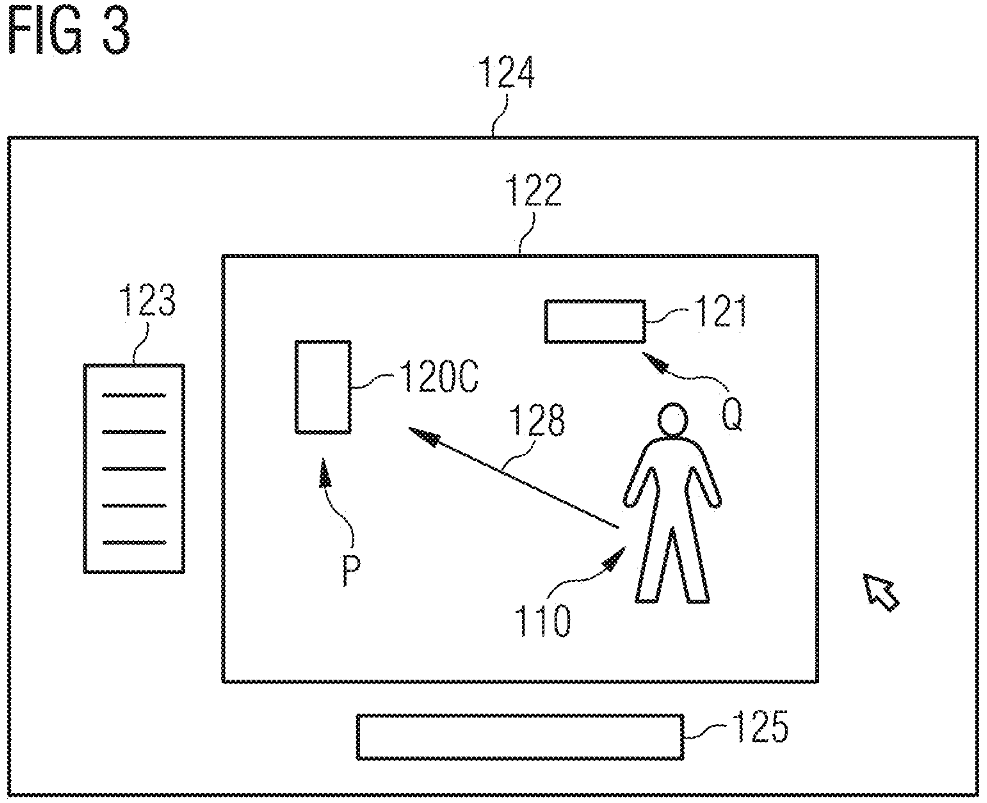
FIG. 3 is a schematic view of a graphical user interface of a video surveillance system, in accordance with one or more embodiments.

Using the afore-mentioned video management system, an operator may use the server 102 and/or the client device 126 to access the plurality of cameras 106A, . . . , 106D, and to display the video feeds 108A, . . . , 108D captured by the same. Here, it will be understood that the video feeds are displayed on display devices connected to the server 102 and/or the client device 126 in a known manner, as part of a graphical user interface (GUI) 124 that is shown in FIG. 3. For example, as shown in FIG. 3, the video from the first camera 106A may be displayed in a display area 122 of the graphical user interface 124. Although the schematic view in FIG. 3 mainly shows the display area 122, it will be understood that the graphical user interface 124, and the associated display generally will show a plurality of additional user interface elements or display areas 123, 125, which allow for operation of the video surveillance system 100 by an operator in a known manner.

During operation, the operator may use an input device coupled to the server 102 and/or the client device 126 to select a video feed of the plurality of video feeds 108A, . . . , 108D captured by the corresponding camera 106A, . . . , 106D to be displayed in the display area 122 of the GUI 124. As a result, the video that is captured by the associated camera, for example, the camera 106A in FIG. 1, is displayed in the display area 122, either in real-time, i.e., simultaneously with the video feed 108A being captured by the camera 106A, or at a later time, by accessing the stored video feed 108A. In some embodiments, the operator may be able to control an orientation of the camera 106A to capture a different area, i.e., may move the field of view 105A of the camera 106A. Further, the operator may use one or more additional user interface elements 123, 125, for example, to select one of the plurality of cameras 106A, . . . , 106D for displaying the associated video feed in the display area 122, or to manipulate the video that is shown in the display area 122. For example, in case of a recorded video feed, the video may be paused, fast forwarded, and the like.

The camera 106A may capture an image including a first object (for example, a person) 110 inside the field of view 107A. The object 110 may be a moving object. As will be described in more detail below, the first camera 106A, or the server 102 and/or the client device 126 may generate a motion vector 128 characterizing the movement of the object 110 using known image recognition techniques. It should be appreciated that the motion vector 128 is only shown for illustrative purposes in FIG. 3, and will generally not be displayed in the display area 122.

As shown in FIG. 3, the display area 122 includes a first user interface element 120C at a position P inside the display area 122, as well as a further user interface element 121 at a position Q inside the display area 122. The first user interface element 120C can be activated or selected by the operator, for example, by clicking on the same using an input device such as a mouse, by tapping the same in case the associated display is a touch-sensitive display, and the like. In some embodiments, other input devices might also be used to activate or select the user interface element 120C. For example, arrow keys on a keyboard, or other appropriate keys, could be used. In the illustrated example, the "up" arrow key could select the user interface element 121, and the "left" arrow key could select the user interface element 120C.

In response to activating the first user interface element 120C, the display by the GUI 124 is switched from displaying the video from the first camera 106A to displaying the video from the third camera 106C. This is because the user interface element 120C includes a reference to the third camera 106C, as will be described in the following. In such a manner, the operator can directly switch the video feeds from the first video feed 108A captured by the first camera 106A to another video feed 108C captured by the third camera 106C, without having to manually select the third camera 106C, for example, from a list of all available cameras. Such a selection from a large list may be difficult, because the cameras may only be indicated by a generic name, a number or the like, and it may not be evident from the list entry where the camera is located. On the other hand, the camera identified by the first user interface element 120C is a camera that is associated with the camera displaying the current video feed 108A in such a manner that the object 110 can be tracked by the operator. For example, the object 110 may exit the field of view 107A of the first camera 106A towards the left when a person enters the building of the at least one facility 300 via the entrance 130. The first user interface element 120C may be associated with the third camera 106C, which is located in the entrance hall of the building and faces the entrance 130. Accordingly, by switching from the first camera 106A to the third camera 106C, the operator can follow the person entering the building via the entrance 130.

Figure 4:
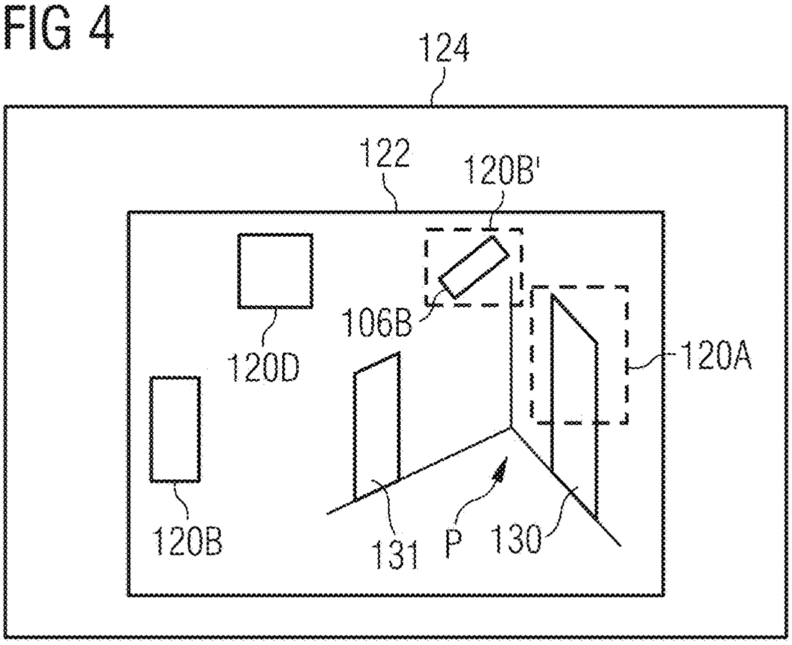
FIG. 4 is another schematic view of the graphical user interface, in accordance with one or more embodiments.

FIG. 4 shows the GUI 124 when the video from the third camera 106C is displayed. It can be seen that the display area 122 includes a user interface element 120A on the right side of the same, which user interface element 120A is associated with the first camera 106A (i.e., includes a reference to the same). This means that, in a state in which the video from the third camera 106C is displayed, and an object or person exits the entrance hall of the building via the entrance 130, the operator can again easily switch to the first camera 106A by selecting or activating the user interface element 120A. Although described herein as being contained within the display area 122, the various user interface elements may straddle the borders of the display area 122, or overlap outside the display area 122, for instance into one or more parts of the graphical user interface 124.

Additionally, as shown in FIG. 4, another user interface element 120B is displayed on the left side of the display area 122, which user interface element 120B is associated with the camera 106B at the opposite corner of the entrance hall, which camera 106B can also be directly recognized in the video that is displayed. A further user interface element 120D is displayed near the top of the display area 122 and associated with the camera 106D on the other side of the door 131. In this manner, when an object or person exits the entrance hall to enter the adjacent corridor, tracking of the object or person also is easily available by selecting or activating the user interface element 120D.

In principle, the individual user interface elements 120A, 120B, 120C, 120D could be set up by an administrator in advance. For example, the administrator could select the first camera 106A, and identify, using known locations of a plurality of additional cameras and also the layout of the building, one or more associated cameras to manually place user interface elements and associate each user interface with an appropriate camera. However, such a manual configuration is cumbersome, because the administrator must not only be aware of the locations of all the cameras, but also be able to associate the designations or identifiers of the respective cameras with the appropriate locations. Clearly, this may be difficult and time-consuming, especially for an inexperienced administrator.

Accordingly, in accordance with the present disclosure, there is provided an automated method for generating the user interface elements 120A, 120B, 120C, 120D, more particularly, the configuration settings for said user interface elements.

Figure 8:
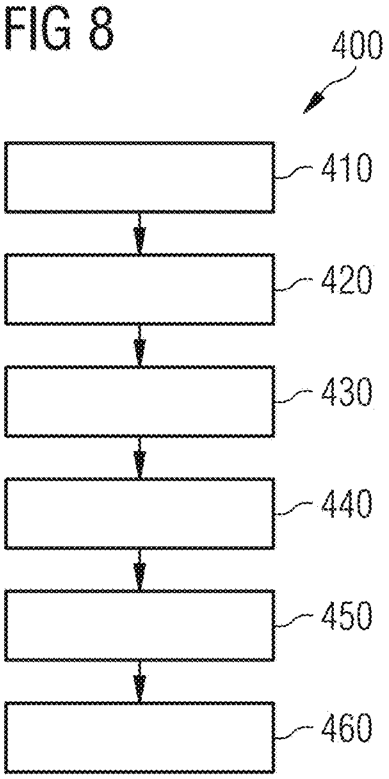
FIG. 8 is a flowchart illustrating an exemplary method for configuring a video surveillance system, in accordance with one or more embodiments.

FIG. 8 shows an exemplary method 400 for configuring the video surveillance system 100 in accordance with the present disclosure. The method 400 can be performed by any one of the server 102 and the client device 126 having access to the plurality of video feeds 108A, . . . , 108D. Collectively, the server 102 and/or the client device 126 performing the methods in accordance with the present disclosure are referred to as a computing device 102, as explained above.

In a first step 410, a first object 110 is identified in a first video feed 108A captured by a first camera 106A of the plurality of cameras 106A, . . . , 106D of the video surveillance system 100. As will be described in more detail in the following, the first object 110, for example, a person moving around the at least one facility 300, can be identified using known image recognition techniques, and characteristics of the first object 110 can be stored, for example, in the memory 114. In some embodiments, the characteristics of the first object 110 are stored as a feature vector, which will be described in more detail below.

In a second step 420, a first time $t_A$ at which the first object 110 is captured by the first camera 106A is determined. Here, in case the first video feed 108A is analyzed in real time, the first time $t_A$ is the current time. In case the first video feed 108A is processed at a later time, i.e., stored, for example, in the memory 114, the first time $t_A$ may be a time stamp included in the stored first video feed 108A.

In a next step 430, it is determined whether the first object 110 can be re-identified in a second video feed captured by a second camera of the plurality of cameras 106A, . . . , 106D within a predetermined time period T1 from the first time $t_A$. For example, the video feeds from the other cameras in the video surveillance system 100 are analyzed in the same manner as the first video feed 108A in order to identify the first object 110. In other words, image recognition is performed on the plurality of other video feeds 108B, . . . , 108D to identify objects, and characteristics of the identified objects are compared to the characteristics of the first object 110 in order to determine whether the same object can be re-identified in one of the other video feeds.

Figure 2:
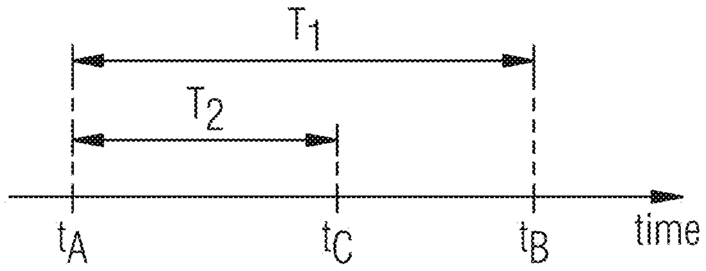
FIG. 2 is a schematic diagram showing a temporal relation between an identification and a re-identification of an object, in accordance with one or more embodiments.

In some embodiments, a time $t_C$ when the object can be re-identified is determined, and it is further determined whether the first object 110 is re-identified within a predetermined time period T1 from the first time $t_A$. This is shown in FIG. 2. Here, for example, the first object 110 is re-identified at a time $t_C$, which is a time period T2 after identification of the first object 110 in the first video feed 108A and less than the time period T1. It will be understood that the period T1 can be fixed or variable based on desired factors, such as the speed of the moving object, the distance, if known, between the areas covered by the cameras, etc. Additionally, FIG. 2 shows that the same object 110 is also re-identified in another one of the plurality of video feeds, for example, the video feed 108B, at a time $t_B$ that is outside of the predetermined time period T1. The time period T1 is used in order to allow a meaningful re-identification and association between different cameras and their respective video feeds. For example, if a person enters the building of the at least one facility 300 via the entrance 130, as shown in FIG. 1, said person will then be captured by the camera 106C. Therefore, it is advantageous to associate the camera 106C with the first camera 106A in order to allow tracking of a person entering via the entrance 130.

On the other hand, this person 110 may, for example, at a later time enter the building via another entrance (not shown), and may first be recognized in the video feed 108D of the camera 106D, without first having passed the first camera 106A. If the predetermined time period T1 were not used, also the further camera 106D would be associated with the first camera 106A, and a corresponding user interface element would be displayed in the display area 122 when the video from the first camera 106A is displayed. However, this is not useful. In order to avoid such a situation, the predetermined time period T1 is defined in an appropriate manner, to make sure that only cameras that are in proximity to the first camera 106A, and which the object 110 may pass after passing the first camera 106A are presented as user interface elements in the display area 122 displaying the video from the first camera 106A. Here, the predetermined time interval T1 may be selected based on a general geometry of the at least one facility 300, a typical movement speed of the object 110, a typical distance between cameras, and the like. For example, if the methods disclosed herein are used for other surveillance systems than those associated with a building or the like, for example, in order to monitor traffic, it is clear that the time periods may be longer and may correspond to a typical travel time of, for example, a vehicle between different traffic monitoring stations.

Further, although in the examples described herein the first object 110 is, for the most part, assumed to be a moving object, it will be appreciated that, in some embodiments, also an unmoving (static) object that is present in the fields of view of two or more cameras can be re-identified in the above manner. In such cases, location information indicating the positions of the cameras, a known relationship between the fields of view of the cameras, characteristics of the object that can be determined using image recognition techniques and that differ between the captured video feeds (for example, different orientations of the object, different lighting or other ambient conditions, shadows), and the like could be used to position the user interface elements accordingly. However, even if no such relations are known or can be determined, it is still possible to place the corresponding user interface elements at arbitrary positions, for example, such that they do not interfere with other user interface elements.

In step 440, after a positive determination in step 430, the second camera is associated with the first camera 106A as an associated camera 106C. In other words, it is determined that a user interface element representing the second camera (here, the camera 106C), may be generated and may be presented in the display area 122 when the display area 122 shows video from the first camera 106A.

Figure 5:
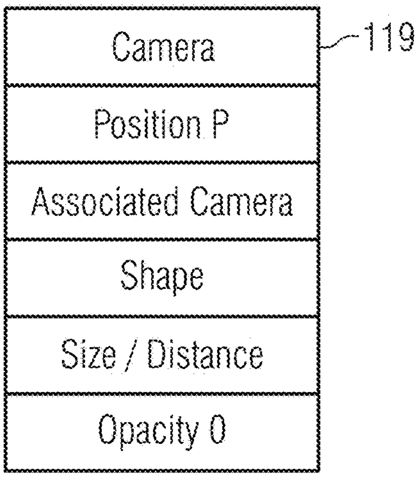
FIG. 5 is a diagram illustrating first attributes of a first user interface element configured to be displayed in a display area of the graphical user interface, in accordance with one or more embodiments.

To this end, in step 450, first configuration settings 118 specifying first attributes 119 (see FIG. 5) of a first user interface element 120C configured to be displayed in the display area 122 of the graphical user interface 124 when the display area 122 displays video from the first camera 106A are generated. As shown in FIG. 5, the first attributes 119 include, inter alia, a position P of the first user interface element 120C in the display area 122 and a reference to the associated camera 106C. The reference is any appropriate computer-readable data element or structure, which can be processed by the server 102 or the client device 126 to identify and select the associated camera. As shown in FIG. 5, in some embodiments, the first attributes 119 further include an indication of the camera that displays the video feed on which the corresponding user interface element 120C should be overlaid, a shape of the first user interface element 120C, a size and/or a distance of the first user interface element 120C to a border of the display area 122, an opacity of the first user interface 120C, and the like.

In step 460, the first configuration settings 118 are stored in the memory 114.

As a result, when a user uses, for example, the client device 126 to display the video captured by the first camera 106A, the client device 126 can read the first configuration settings 118 stored in the memory 114, and generate the first user interface element 120C in accordance with the first attributes 119 specified in the first configuration settings. That is to say, the first user interface element 120C can be displayed at the determined position P inside the display area 122, with the other characteristics specified in the first configuration settings 119. As the first user interface element 120C includes the reference to the associated camera 106C, upon activation or selection of the first user interface element 120C, the user can directly switch the display in the display area 122 from the video from the first camera 106A to the video from the associated camera 106C.

It should be appreciated that, although it was described above that one user interface element 120C is generated, which is associated with one of the plurality of cameras 106A, . . . , 106D, the present disclosure is not limited to this. In other words, any camera, for which the first object 110 can be re-identified within the predetermined time period T1, may be represented in the display area 122 using an associated user interface element. FIG. 4 shows an example, in which user interface elements 120A, 120B, 120D, 120B' are displayed in the display area 122 and are associated with the respective cameras 106A, 106B, 106D. This is because, for example, a person exiting the entrance hall shown in FIG. 1 may do so via the entrance 130, or via one of the doors 131 and 133. Further, when the person moves inside the entrance hall from right to left in FIG. 1, the person may leave the field of view 107C of the camera 106C, and may enter the field of view 107B of the camera 106B.

It will be appreciated that the above-described method will generally be performed for all cameras in the video surveillance system 100. In other words, for each of the plurality of cameras 106A, . . . , 106D, one or more user interface elements may be automatically generated, which user interface elements can be selected or activated by a user to automatically switch display of the video feed of one camera to that of a video feed from an associated camera, which the first object 110 will likely pass after passing the first camera.

In some embodiments, location information 104 identifying locations 105A-105D of the plurality of cameras 106A-106D of the video surveillance system 100 is used in the step 430 of determining whether the first object 110 can be re-identified. The location information 104 may be stored in the memory 114, and may be accessed by the computing device 102 performing the methods disclosed herein. The computing device 102 may determine a number of candidate cameras 106B-106D in proximity to the first camera 106A based on the location information 104, and may determine whether the first object 110 can be re-identified in one of a plurality of candidate video feeds 108B-108D captured by the candidate cameras 106B-106D within the predetermined time period T1 from the first time $t_A$. In some embodiments, the number of candidate cameras 106B-106D could be limited to a predetermined number (for example, one or two) in a first step, and after successful association between two or more cameras, the process could be repeated for other groups of cameras, preferably, groups of cameras that include at least one camera for which an association has already been established.

As a result, the processing time can be shortened, because only cameras that are in proximity to the first camera are analyzed to determine whether the object 110 can be re-identified. In other words, it is not necessary to perform image recognition and analysis of the video feeds of remote cameras, for example, inside a different building, outside of a predetermined distance from the first camera, and the like. For example, geographical coordinates of each camera of the plurality of cameras in the video surveillance system 100 may be stored in the memory 114, and may be used to determine whether the video feed captured by a given camera should be analyzed in order to determine whether the first object 110 can be re-identified.

In some embodiments, the computing device 102 may, in response to identifying the first object 110 in the first video feed 108A, obtain the plurality of candidate video feeds 108B-108D, and perform image recognition on the plurality of candidate video feeds to re-identify the first object 110. In some embodiments, the plurality of candidate video feeds 108B-108D may be received and processed by the computing device 102 in real time.

In the above manner, the video surveillance system 100 can be configured in real time, during normal operation of the same. When an object is identified in a first video feed 108A, the computing device 102 obtains a plurality of candidate video feeds 108B-108D of the cameras that are near the first camera 106A, and determines whether the first object 110 can be re-identified. In other embodiments, however, the processing does not need to be in real time, and the system can operate by selecting one of a plurality of stored video feeds, for example, the video feed 108A from the first camera 106A, and process the video feeds of the cameras that are determined to be in proximity to the first camera 106A in order to determine whether the first object 110 can be re-identified.

In some embodiments, the computing device 102 may obtain a first feature vector 150 characterising the first object 110, which first feature vector 150 is associated with the first time $t_A$. As will be appreciated by the skilled person, such a feature vector is a unique or pseudo-unique numerical representation of the first object 110, and is based on the general appearance of the first object (shape, size, form) and other features of the same. The feature vector may be a multidimensional vector having any suitable number of dimensions and entries, may include values of any suitable range (e.g., normalized values or not), and may be structured in any suitable fashion. The feature vector need not be an intelligible representation of the first object; that is to say, the feature vector may not, upon review or evaluation, present an uninitiated user of the system with a clear indication of what the first object 110 looks like, what features it has, or the like. The feature vector may thus be any suitable numeric representation of the first object 110 as depicted in the first video feed 108A. It will be appreciated that the first feature vector 150 may be generated using a neural network or other machine learning models in a known manner.

The computing device 102 may compare the first feature vector 150 to at least one second feature vector 160 associated with the second video feed 108B-108D, and may determine that the first object 110 is re-identified in the second video feed 108B-108D when the at least one second feature vector 160 matches the first feature vector 150 and is associated with a second time $t_C$ within the predetermined time period T1. Here, the expression "matches" will be immediately understood by the skilled person as referring to, for example, a distance calculated in the vector space in which the first and second feature vectors 150 and 160 are defined. A match can be determined in case a distance between the feature vectors is below a predetermined threshold. This predetermined threshold can be determined in an appropriate manner, depending on the desired accuracy and reliability of determination.

Figure 7:
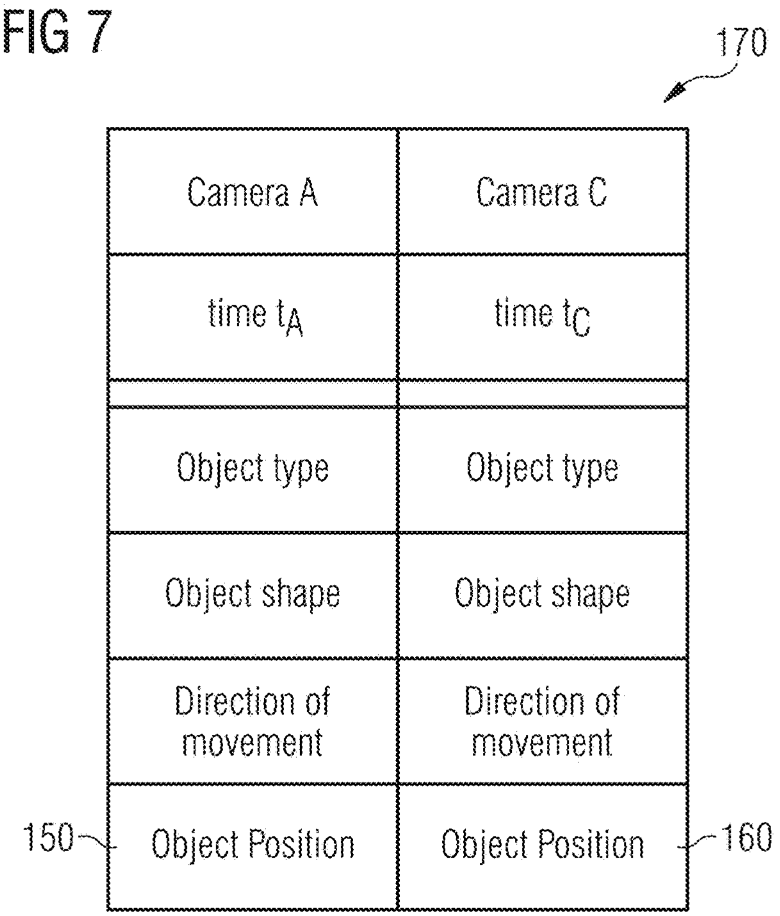
FIG. 7 is a diagram illustrating a database of feature vectors, in accordance with one or more embodiments.

As mentioned above, the processing does not need to be performed in real time. For example, in some embodiments, the first feature vector 150 and the at least one second feature vector 160 can be retrieved from a database 170 of feature vectors generated in advance. FIG. 7 shows one example for the database 170 including the first feature vector 150 and a second feature vector 160. As shown in FIG. 7, each feature vector may specify, for example, an object type, an object shape, a direction of movement of the object, and other characteristics of the identified object, for example, a position of the object in the field of view of the camera. Each of the first feature vector 150 and the second feature vector 160 is associated with an indication of the camera capturing the video feed in which the object was identified, as well as a time at which the object was identified in the corresponding video feed. Using a database such as the database 170 shown in FIG. 7, a large number of previously obtained feature vectors can be analyzed in order to determine whether the same object 110 was identified in two different video feeds within the predetermined time period T1, using the associated times (or time stamps) $t_A$ and $t_C$.

In some embodiments, the database 170 is continually updated during operation of the video surveillance system 100. For example, any time an object, more particularly, a moving object is identified in one of the plurality of video feeds 108A, . . . , 108D, a corresponding feature vector may be generated and stored in the database 170. At predetermined time intervals, or upon request by a user, the above-described method can be performed in order to analyze the feature vectors stored in the database 170. Object identification may be easier when the number of moving objects in a camera view are fewer, and thus times of lower traffic or movement of people may be selected as suitable to update the database 170. In case a new association between two cameras is recognized in this analysis, a new user interface element for the corresponding cameras may be generated, more precisely, configuration settings allowing for the appropriate display of this user interface element can be generated and stored in the memory 114.

In some embodiments, characteristics of the first feature vector 150 may be specified, and the first feature vector 150 to be used for the comparison may be selected based on the specified characteristics. For example, it may be desirable to only use persons passing the respective cameras for the re-identification and the generation of the associations between the cameras. In other embodiments, specific colors or the like, which may be more reliably recognized using image recognition techniques, may be selected in order to be used for generating the association between the cameras. For example, it is conceivable that security personnel wearing specific clothes or accessories having signal colors move around the at least one facility 300 and pass by the cameras in the video surveillance system in order to configure the same in the above-described manner, at least in an initial configuration of the video surveillance system 100. In this fashion, particular characteristics of objects to be re-identified for use in associating cameras and, based thereon, generating configuration settings may be suggested by the computing device 102 and/or may be selected by a user, for example, via the client device 126, as part of initiating the method 400.

In some embodiments, the method includes performing image processing or pre-processing on the first video feed 108A prior to generating the first feature vector 150 for the first object 110. For example, the video feed 108A may be processed to identify a particular frame, or portion of a frame, from which an image of suitable quality may be obtained, in order to be able to more reliably identify the first object 110. Additionally, various post-processing techniques may also be applied to the image to improve the identification of the first object 100. If a camera (i.e., the video feed from the camera) provides multiple views of the first object 110, the multiple views can be used when generating the feature vector. This may improve the accuracy of re-identifying the object using the generated feature vectors.

In some embodiments, the image processing includes at least one of selecting a specific frame of the first video feed 108A, extracting a portion of a frame of the first video feed 108A including the first object 110 (cropping the frame), and enlarging the portion of the frame of the first video feed 108A including the first object 110. Such a processing may facilitate a reliable identification of the first object 110, in particular, a reliable generation of an accurate feature vector 150.

In some embodiments, the first feature vector 150 and/or the at least one second feature vector 160 are generated by the first camera 106A and the second camera 106B-106D, respectively. In other words, the cameras 106A, . . . , 106D may be capable of producing the corresponding feature vectors, and may forward the feature vectors to the server 102 for storing and/or processing the same. In other embodiments, however, the corresponding feature vectors may be generated by the server 102 or another element of the security system 100, either in real time or on the basis of stored video feeds from the plurality of cameras 106A, . . . , 106D.

In some embodiments, the computing device 102 may generate second configuration settings 118 specifying second attributes 119 of a second user interface element 120A configured to be displayed in a display area 122 of the graphical user interface 124 when the display area 122 displays video from the associated camera. The second attributes 119 include a position P of the second user interface element 120A in the display area 122 and a reference to the first camera 106A. The computing device 102 may store the second configuration settings 118 in the memory 114. In this manner, when the first object 110 is re-identified in the video feed 108C from the associated camera 106C, at the same time as generating the first user interface element 120C to be shown in the display area 122 when video from the first camera 106A is displayed, the corresponding further user interface element 120A, which includes a reference to the first camera 106A and is displayed in the display area 122 when video from the third camera 106C is displayed, can be automatically generated at the same time as the first user interface element 120C. This can speed up the configuration of all user interface elements for the video surveillance system, because it can be assumed that, when the third camera 106C is an associated camera for the first camera 106A, the same is true in reverse, i.e., the first camera 106A is an associated camera for the third camera 106C.

In some embodiments, the computing device 102 obtains at least one motion vector 128 characterizing a movement of the object 110 from at least one of the first video feed 108A and the video feed 108C captured by the associated camera 106C. The computing device 102 may determine the position P of the first user interface element 120C and/or the second user interface element 120A based at least in part on the at least one motion vector 128. In this manner, an appropriate position P of the first user interface element 120C in the display area 122 that allows for an intuitive selection of the same by an operator can be generated. For example, if the movement vector 128 of the object 110 captured by the first camera 108A indicates that the object 110 moves in a certain direction, the position P of the first user interface element 120C may be in this particular direction from the first object 110, for example, close to a boundary of the display area 122, which corresponds to a boundary of the field of view 107A of the first camera 106A. This allows for an intuitive selection of the first user interface element 120C as the first object 110 moves toward the camera associated with said user interface element. This is especially advantageous when there are several user interface elements associated with different cameras in the display area 122.

In some embodiments, the at least one motion vector 128 specifies a speed of movement and/or a direction of movement of the object 110 entering or exiting the field of view 107A of the first camera 106A, and/or a speed of movement and/or a direction of movement of the object 110 entering or exiting the field of view 107C of the associated camera 106C. In this manner, the position P of the first object 110 can be specified in even more detail as corresponding to the position where the first object 110 exits a field of view of the first camera 106A and enters the field of view 107C of the associated camera 106C.

In some embodiments, the direction of movement of the object 110 may be determined from a still frame of the first video feed 108A including the first object 110. In other words, it may not be necessary to analyze a movement of the first object 110 in order to determine the direction of movement of the same. Instead, the direction of movement can be estimated from the first object itself, using a single frame of the first video feed 108A. For example, in case of a person, a direction in which the person is facing may be used to determine the direction of movement of the person. This may further reduce the processing that is required for determining the movement of the first object 110.

In some embodiments, the computing device 102 may determine a positional relationship between the field of view 107A of the first camera 106A and the field of view 107C of the associated camera 106C based at least in part on the at least one motion vector 128. In this manner, an arrangement and possible overlap of the fields of view of the two cameras can be determined, and the first user interface element (as well as the above-mentioned second user interface element) can be positioned at the appropriate position in the fields of view of the respective camera.

In some embodiments, the at least one motion vector 128 is determined by at least one of the first camera 106A and the associated camera 106C, and the at least one motion vector 128 is received at the computing device 102 from the at least one of the first camera 106A and the associated camera 106C. In this manner, appropriately configured cameras can determine motion vectors of objects captured by the same, and store and/or forward the determined motion vectors to the computing device 102 for further processing. Alternatively, however, the motion vectors may also be determined by the computing device 102 from the video feeds 108A-108D received from the cameras 106A-106D.

In some embodiments, the computing device 102 determines at least one of a position of the first object 110 in an image captured by the first camera 106A and a movement path of the first object 110 in the first video feed 108A, and determines a position P of the first user interface element 120C based at least in part on the position and/or the movement path of the first object 110. In particular, when the position of the object 110 is the last position that can be identified, it is reasonable to assume that the position corresponds to the position at which the object 110 leaves the field of view 107A of the first camera 106A. Therefore, the position P of the user interface element 120C can be associated with the position of the first object 110 at that time. If the movement path of the first object 110 is also determined, then a direction of movement can be inferred from the movement path, and the first user interface element 120C can be identified in correspondence to this direction of movement, as mentioned above.

In some embodiments, the computing device 102 may determine a positional relationship between the first camera 106A and the associated camera 106C based on the location information 104. In this case, the position P of the first user interface element 120C and/or the position P of the second user interface element 120A can be determined based at least in part on the positional relationship. That is to say, in some embodiments, the location information itself is used to not only determine which cameras are in proximity to the first camera, and should be used to analyze their video feeds as to whether the first object 110 can be re-identified, but also the position P of the first user interface element 120C can be determined from this positional relationship. For example, using the known positions between two cameras, a vector identifying a direction from the first camera to the second camera in a global coordinate system can be determined, and the vector can be related to the field of view of the first camera in order to identify a position P that is along the direction towards the associated camera in the display area 122. Of course, it will be appreciated that this requires detailed knowledge of the positions of the respective cameras in a coordinate system such as a global coordinate system.

Figure 6:
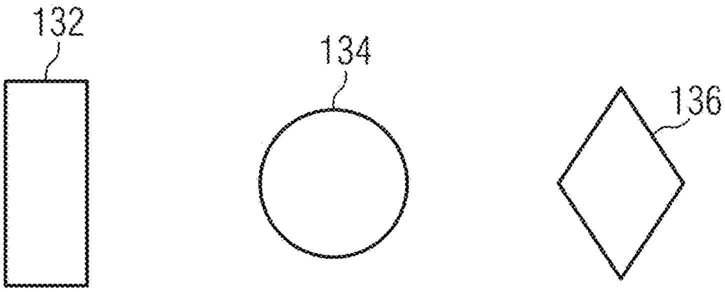
FIG. 6 is a schematic diagram illustrating examples for different shapes of the first user interface element, in accordance with one or more embodiments.

In some embodiments, the computing device 102 determines, based at least in part on the location information 104, whether one or more doorways or entrances/exits are present between the location of the first camera 106A and the location of the associated camera 106C, and specifies a shape 132, 134 of the first user interface element 120C as part of the first attributes 110 in accordance with the determination. For example, as shown in FIGS. 3 and 4, when there is a doorway or door present between the locations of two cameras, a rectangular shape 132 shown in FIG. 6 may be used to indicate the associated camera. This conveys additional information to a user that, when passing from the field of view of the first camera 106A to the field of view of the second camera 106C, the first object 110 has to pass through a doorway or entrance/exit. If no such doors or entrances/exits are present, a different symbol, for example, a circle 134 shown in FIG. 6 may be used to identify the associated camera. In some instances, as shown in FIG. 4, the associated camera may be visible in the field of view of the first camera 106A. In such a case, the associated camera may be identified using yet another symbol, such as the parallelepiped 136 shown in FIG. 6. In some embodiments, image recognition may also be used to identify the associated camera in the image that is captured by the first camera 106A, and the position P of the user interface element 120B' may be selected such that it overlaps with the associated camera 106B in the image. This is shown in FIG. 4, where the associated user interface element 120B' is indicated by dashed lines.

In some embodiments, the computing device 102 may determine a time interval T2 between the identification of the object 110 in the first video feed 108A and a re-identification of the object 110 in the video feed 108C captured by the associated camera 106C, and may generate the first configuration settings 118 based at least in part on the time interval T2. In this manner, for example, depending on the travel time from the first camera to the second camera, a size and/or a position of the user interface element 120C may be varied. For example, the longer the travel time, the further away the second camera, and the smaller the user interface element 120C may be made. This may indicate to the user that he should wait a while before selecting or activating the user interface 120C to obtain a seamless tracking of the first object 110. In some embodiments, a countdown or timer can be displayed as part of the user interface element, which countdown or timer indicates to a user how long he/she should wait before selecting the next camera. Additionally, the position P of the first user interface element 120C may be moved as much as possible towards the edge of the display area 122, to indicate that there is a relatively large distance to the associated camera 106C.

The first attributes 110 may include at least one of a size and a distance from a boundary of the display area 122 of the first user interface element 120C, which size and distance may be determined at least in part on the time interval T2.

In some embodiments, a client device 126 displaying video from the first camera 106A in the display area 122 of the graphical user interface 126 may prompt a user of the client device 126 to confirm whether the first user interface element 120C is to be displayed in the display area 122. The result of the confirmation may be stored, for example, at the client device 126. In such a manner, the first user interface element 120C (and all other user interface elements), while they are identified as possible user interface elements to be displayed on the associated video feeds, are not automatically displayed without asking for confirmation. This may avoid cluttering the display area 122 with a large number of user interface elements, and may allow a configuration of the graphical user interface 124 in accordance with a user's preferences. For example, some users may be well aware of which cameras are associated with which cameras, and may not require presence of the user interface elements.

In some embodiments, the client device 126 may allow for adjusting at least a position P of the first user interface element 120C in the display area 122 in response to a user input. The adjusted position P may be stored as part of the first configuration settings 118. In this manner, a user has the freedom to modify the initially created configuration to his or her individual preferences. For example, some users may prefer arranging the user interface elements in a specific order or relation with each other. Additionally, some users may wish to avoid covering certain portions of the image with user interface elements, or the like.

In some embodiments, the first attributes 119 include an opacity O of the first user interface element 120C. The method may further comprise adjusting the opacity O of the first user interface element 120C displayed in the display area 122 in response to user input. In such a manner, a user that views the display area 122 may decide that some user interface elements are located at positions where they cover a portion of the image that the user wishes to be able to observe. By increasing the opacity O, this portion can be observed while still providing the functionality of quickly switching to the associated camera by selecting a user interface element.

In some embodiments, the computing device 102 determines a position Q of at least one further user interface element 121 configured to be displayed in the display area 122 when the display area 122 displays video from the first camera 106A, and the position P of the first user interface element 120C may be specified such that the first user interface element 120C does not overlap the at least one further user interface element 121. This is shown in FIG. 3. In such a manner, at least the position of the first user interface element 120C may be specified such that it does not overlap with other user interface elements, which avoids the risk of accidentally selecting or activating a wrong user interface element when trying to track the first object 110.

In some embodiments, attributes of the at least one further user interface element 121 may be determined, and a position P of the first user interface element 120C may be specified such that the first user interface element 120C is positioned adjacent to the at least one further user interface element 121 in case there is at least a partial match between additional attributes included in the first attributes 119 and additional attributes included in the attributes of the at least one further user interface element 121. The additional attributes may include one or more of: a distance to the first camera 106A; a location of the associated camera; information as to whether the associated camera is an indoor or an outdoor camera; a background in the video feed captured by the associated camera, and the like. In this manner, if there are several associated cameras, the associated cameras and their respective user interface elements can be grouped in the view that is shown in the display area 122, such that the user can immediately grasp which of the associated cameras have similar properties, such that they may be selected alternatively or in sequence.

In some embodiments, the location information 104 is topological information specifying a logical and/or geographical distribution, scale and connection of spaces and/or locations. For example, a mark-up language or the like may be used to describe the topological information associated with the facility 300 or a similar facility, and this topological information, which may include information relating to, for example, a building, a floor, a room, and other units of the topology of the facility, as well as the relationships therebetween, can be processed in an appropriate manner to determine candidates for associated cameras that the object 110 may reach after passing by the first camera 106A.

In some embodiments, as mentioned above, identifying and re-identifying the first object 110 is performed using a machine learning model 155, which may be embodied in the memory 114 in combination with at least one processor 140 of the server 102, for example, a convolutional neural network or the like. This may be particularly advantageous in case feature vectors are used to characterize the first object 110 as described above.

In the system disclosed herein, the program instructions executed by the at least one processor 140 may include instructions for determining a presence of a new camera 106E (indicated by dashed lines in FIG. 1) added to the plurality of cameras. In response to such a determination, whether automatic or based on user input, the methods disclosed herein may be executed to update the configuration if the video surveillance system 100, more particularly, generate configuration settings for user interface elements indicating the new camera 106E as an associated camera or to be displayed when video from the new camera is shown. Alternatively, a notification 141 indicating that a reconfiguration should be performed may be output. This allows for a flexible and up-to-date configuration of the video surveillance system 100.

In another aspect of the present disclosure, a non-transitory computer-readable medium can have stored thereon program instructions executable by a processor of a computing device 102 associated with the surveillance system 100 to perform any of the methods disclosed herein.

Further aspects of the present disclosure are as follows:

1. A computer-implemented method for configuring a video surveillance system (100), the method comprising:
   at a computing device (102) associated with the video surveillance system (100),
   identifying a first object (110) in a first video feed (108A) captured by a first camera (106A) of a plurality of cameras (106A-106D) of the video surveillance system (100);
   determining a first time ($t_A$) at which the first object (110) is captured by the first camera (106A);
   determining whether the first object (110) can be re-identified in a second video feed (108B-108D) captured by a second camera (106B-106D) of the plurality of cameras (106A-106D) within a predetermined time period (T1) from the first time ($t_A$);
   when the first object (110) is re-identified in the second video feed (108B-108D) within the predetermined time period (T1), associating the second camera with the first camera (106A) as an associated camera (106C);
   generating first configuration settings (118) specifying first attributes (119) of a first user interface element (120C) configured to be displayed in a display area (122) of a graphical user interface (124) when the display area (122) displays video from the first camera (106A), the first attributes (119) including a position (P) of the first user interface element (120C) in the display area (122) and a reference to the associated camera (106C); and
   storing the first configuration settings (118) in a memory (114).
2. The method of aspect 1, further comprising:
   at the computing device (102) associated with the video surveillance system (100),
   obtaining location information (104) identifying locations (105A-105D) of the plurality of cameras (106A-106D) of the video surveillance system (100);
   determining a number of candidate cameras (106B-106D) in proximity to the first camera (106A) based on the location information (104); and
   determining whether the first object (110) can be re-identified in one of a plurality of candidate video feeds (108B-108D) captured by the candidate cameras (106B-106D) within the predetermined time period (T1) from the first time ($t_A$).
3. The method of aspect 2, further comprising, by the computing device (102) and in response to identifying the first object (110) in the first video feed (108A), obtaining the plurality of candidate video feeds (108B-108D), and performing image recognition on the plurality of candidate video feeds to re-identify the first object (110).
4. The method of aspect 3, wherein the plurality of candidate video feeds (108B-108D) are received and processed by the computing device (102) in real time. 5. The method of aspect 1 or 2, further comprising:
   at the computing device (102) associated with the video surveillance system (100),
   obtaining a first feature vector (150) characterizing the first object (110), the first feature vector (150) being associated with the first time ($t_A$);
   comparing the first feature vector (150) to at least one second feature vector (160) associated with the second video feed (108B-108D); and
   determining that the first object (110) is re-identified in the second video feed (108B-108D) when the at least one second feature vector (160) matches the first feature vector (150) and is associated with a second time ($t_C$) within the predetermined time period (T1).
6. The method of aspect 5, further comprising, by the computing device (102), retrieving the first feature vector (150) and the at least one second feature vector (160) from a database (170) of feature vectors generated in advance.
7. The method of aspect 6, wherein the database (170) is continually updated during operation of the video surveillance system (100).
8. The method of any one of aspects 5 to 7, further comprising specifying characteristics of the first feature vector (150), and selecting the first feature vector (150) to be used for the comparison based on the specified characteristics.
9. The method of any one of aspects 5 to 8, further comprising performing image processing on the first video feed (108A) prior to generating the first feature vector (150) for the first object (110).
10. The method of aspect 9, wherein the image processing includes at least one of selecting a specific frame of the first video feed (108A), extracting a portion of a frame of the first video feed (108A) including the first object (110), and enlarging the portion of the frame of the first video feed (108A) including the first object (110).
11. The method of any one of aspects 5 to 10, wherein the first feature vector (150) and/or the at least one second feature vector (160) are generated by the first camera (106A) and the second camera (106B-106D), respectively.

12. The method of any one of aspects 1 to 11, further comprising generating, by the computing device (102), second configuration settings (118) specifying second attributes (119) of a second user interface element (120A) configured to be displayed in the display area (122) of the graphical user interface (124) when the display area (122) displays video from the associated camera (106C), the second attributes (119) including a position (P) of the second user interface element (120A) in the display area (122) and a reference to the first camera (106A), and storing the second configuration settings (118) in the memory (114).
13. The method of any one of aspects 1 to 12, further comprising:
at the computing device (102),
obtaining at least one motion vector (128) characterizing a movement of the object (110) from at least one of the first video feed (108A) and the video feed (108C) captured by the associated camera (106C); and
determining the position (P) of the first user interface element (120C) and/or the second user interface element (120A) based at least in part on the at least one motion vector (128).
14. The method of aspect 13, wherein the at least one motion vector (128) specifies a speed of movement and/or a direction of movement of the object (100) entering or exiting a field of view (107A) of the first camera (106A), and/or a speed of movement and/or a direction of movement of the object (100) entering or exiting a field of view (107C) of the associated camera (106C).
15. The method of aspect 14, further comprising determining the direction of movement of the object (110) from a still frame of the first video feed (108A) including the object (110).
16. The method of aspect 14 or 15, further comprising determining, by the computing device (102), a positional relationship between the field of view (107A) of the first camera (106A) and the field of view (107C) of the associated camera (106C) based at least in part on the at least one motion vector (128).
17. The method of any one of aspects 13 to 16, wherein the at least one motion vector (128) is determined by at least one of the first camera (106A) and the associated camera (106C), the method further comprising receiving, at the computing device (102), the at least one motion vector (128) from the at least one of the first camera (106A) and the associated camera (106C).
18. The method of any one of aspects 1 to 17, further comprising, by the computing device (102), determining at least one of a position of the first object (110) in an image captured by the first camera (106A) and a movement path of the first object (110) in the first video feed (108A), and determining the position (P) of the first user interface element (120C) based at least in part on the position and/or the movement path of the first object (110).
19. The method of any one of aspects 2 to 4, further comprising determining, by the computing device (102), a positional relationship between the first camera (106A) and the associated camera (106C) based on the location information (104), wherein the position (P) of the first user interface element (120C) and/or the position (P) of the second user interface element (120A) is determined based at least in part on the positional relationship.
20. The method of any one of aspects 2 to 4 and 19, further comprising determining, by the computing device (102) and based at least in part on the location information (104), whether one or more doorways (130) are present between the location of the first camera (106A) and the location of the associated camera (106C), and specifying a shape (132, 134) of the first user interface element (120C) as part of the first attributes (119) in accordance with the determination.
21. The method of any one of aspects 1 to 20, further comprising determining, by the computing device (102), a time interval (T2) between the identification of the object (110) in the first video feed (108A) and the re-identification of the object (110) in the video feed (108C) captured by the associated camera (106C), and generating the first configuration settings (118) based at least in part on the time interval (T2).
22. The method of aspect 21, wherein the first attributes (119) include at least one of a size and a distance from a boundary of the display area (122) of the first user interface element (120C), which size and distance are determined based at least in part on the time interval (T2).
23. The method of any one of aspects 1 to 22, further comprising:
at a client device (126) displaying video from the first camera (106A) in the display area (122) of the graphical user interface (126), prompting a user to confirm whether the first user interface element (120C) is to be displayed in the display area (122); and
storing a result of the confirmation.
24. The method of any one of aspects 1 to 23, further comprising:
adjusting, by a client device (126) displaying the graphical user interface (126), at least the position (P) of the first user interface element (120C) in the display area (122) in response to user input; and
storing the adjusted position (P) as part of the first configuration settings (118).
25. The method of any one of aspects 1 to 24, wherein the first attributes (119) include an opacity (O) of the first user interface element (120C), the method further comprising adjusting the opacity (O) of the first user interface element (120C) displayed in the display area (122) in response to user input.
26. The method of any one of aspects 1 to 25, further comprising:
determining, by the computing device (102), a position (Q) of at least one further user interface element (121) configured to be displayed in the display area (122) when the display area (122) displays video from the first camera (106A); and
specifying the position (P) of the first user interface element (120C) such that the first user interface element (120C) does not overlap the at least one further user interface element (121).
27. The method of aspect 26, further comprising:
determining attributes of the at least one further user interface element (121); and
specifying the position (P) of the first user interface element (120C) such that the first user interface element (120C) is positioned adjacent to the at least one further user interface element (121) in case there is at least a partial match between additional attributes included in the first attributes (119) and additional attributes included in the attributes of the at least one further user interface element (121), the additional attributes including one or more of: a distance to the first camera (108A); a location of the associated camera; information as to whether the associated camera is an indoor or an outdoor camera; a background in the video feed captured by the associated camera.

28. The method of any one of aspects 1 to 27, wherein the location information (104) is topological information specifying a logical and/or geographical distribution, scale and connection of spaces and/or locations.

29. The method of any one of aspects 1 to 28, wherein identifying and re-identifying the first object (110) is performed using a machine learning model (155).

30. A surveillance system (100) comprising:
 a plurality of cameras (106A-106D);
 a computing device (102) including at least one processor (140); and
 a memory (14) having stored thereon program instructions executable by the at least one processor (140) for:
  identifying a first object (110) in a first video feed (108A) captured by a first camera (106A) of the plurality of cameras (106A-106D);
  determining a first time ($t_A$) at which the first object (100) is captured by the first camera (106A);
  determining whether the first object (110) can be re-identified in a second video feed (108B-108D) captured by a second camera (106B-106D) of the plurality of cameras (106A-106D) within a predetermined time period (T1) from the first time ($t_A$);
  when the first object (110) is re-identified in the second video feed (108B-108D) within the predetermined time period (T1), associating the second camera with the first camera (106A) as an associated camera (106C);
  generating first configuration settings (118) specifying first attributes (119) of a first user interface element (120C) configured to be displayed in a display area (122) of a graphical user interface (124) when the display area (122) displays video from the first camera (106A), the first attributes (119) including a position (P) of the first user interface element (120C) in the display area (122) and a reference to the associated camera (106C); and
  storing the first configuration settings (118) in the memory (114).

31. The system of aspect 30, wherein the computing device (102) is a central computing device, and the system further comprises at least one client device (126) in communication with the memory (114) and configured to display video from the first camera (106A) in the display area (122) in accordance with the first configuration settings (118).

32. The system of aspect 30 or 31, wherein the program instructions are executable by the at least one processor (140) for determining a presence of a new camera (106E) added to the plurality of cameras (106A-106D), and, in response to the determination, one of: executing the program instructions of aspect 30 to reconfigure the system (100); and outputting a notification (141) indicating that a reconfiguration of the system should be performed.

33. The system of any one of aspects 30 to 32, wherein the surveillance system (100) is part of an access control system (200) controlling access to at least one facility (300).

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Throughout the disclosure, numerous references are made regarding servers, services, interfaces, or other systems and computing devices. It should be appreciated that the use of such terms is deemed to represent one or more computing devices having at least one processor configured to execute software instructions stored in a computer readable tangible, non-transitory medium. For example, a server can include one or more computers, operating as a web server, database server, or other type of computer server in a manner to fulfil described roles, responsibilities, or functions.

The disclosure provides many example embodiments. Although each embodiment represents a single combination of inventive elements, other examples may include all possible combinations of the disclosed elements.

The technical solution of embodiments may be in the form of a software product. The software product may be stored in a non-volatile and non-transitory storage medium, which can be a compact disc read-only memory (CD-ROM), a USB flash disc or a removable hard disc. The software product includes a number of instructions that enable a computer device to execute the methods provided by the embodiments.

The embodiments and examples described herein are illustrative and non-limiting. Practical implementation of the features may incorporate the combination of some or all of the aspects, and features described herein should not be taken as indications of future or existing product plans.

Although the embodiments have been described in detail, it should be understood that various changes, substitutions and alterations can be made herein without departing from the scope as defined by the appended claims.

The invention claimed is:

1. A computer-implemented method for configuring a video surveillance system, the method comprising:
 at a computing device associated with the video surveillance system,
  identifying a first object in a first video feed captured by a first camera of a plurality of cameras of the video surveillance system;
  determining a first time at which the first object is captured by the first camera;
  determining whether the first object can be re-identified in a second video feed captured by a second camera of the plurality of cameras within a predetermined time period from the first time;
  when the first object is re-identified in the second video feed within the predetermined time period, associating the second camera with the first camera as an associated camera;
  generating first configuration settings specifying first attributes of a first user interface element configured to be displayed in a display area of a graphical user interface when the display area displays video from the first camera, the first attributes including a position of the first user interface element in the display area and a reference to the associated camera; and storing the first configuration settings in a memory.

2. The method of claim 1, further comprising:

at the computing device associated with the video surveillance system, obtaining location information identifying locations of the plurality of cameras of the video surveillance system;

determining a number of candidate cameras in proximity to the first camera based on the location information; and determining whether the first object can be re-identified in one of a plurality of candidate video feeds captured by the candidate cameras within the predetermined time period from the first time.

3. The method of claim 2, further comprising, by the computing device and in response to identifying the first object in the first video feed, obtaining the plurality of candidate video feeds, and performing image recognition on the plurality of candidate video feeds to re-identify the first object.

4. The method of claim 3, wherein the plurality of candidate video feeds is received and processed by the computing device in real time.

5. The method of claim 1, wherein the identifying of the first object comprises, at the computing device associated with the video surveillance system, obtaining a first feature vector characterizing the first object, the first feature vector being associated with the first time, and wherein determining whether the first object can be re-identified comprises comparing the first feature vector to at least one second feature vector associated with the second video feed and determining that the first object is re-identified in the second video feed when the at least one second feature vector matches the first feature vector and is associated with a second time within the predetermined time period.

6. The method of claim 5, further comprising, by the computing device, retrieving the first feature vector and the at least one second feature vector from a database of feature vectors generated in advance.

7. The method of claim 6, wherein the database is continually updated during operation of the video surveillance system.

8. The method of claim 5, further comprising specifying characteristics of the first feature vector, and selecting the first feature vector to be used for the comparison based on the specified characteristics.

9. The method of claim 5, further comprising performing image processing on the first video feed prior to generating the first feature vector for the first object, wherein the image processing includes at least one of selecting a specific frame of the first video feed, extracting a portion of a frame of the first video feed including the first object, and enlarging the portion of the frame of the first video feed including the first object.

10. The method of claim 1, further comprising generating, by the computing device, second configuration settings specifying second attributes of a second user interface element configured to be displayed in the display area of the graphical user interface when the display area displays video from the associated camera, the second attributes including a position of the second user interface element in the display area and a reference to the first camera, and storing the second configuration settings in the memory.

11. The method of claim 1, further comprising:

at the computing device, obtaining at least one motion vector characterizing a movement of the object from at least one of the first video feed and the video feed captured by the associated camera; and determining the position of the first user interface element and/or the second user interface element based at least in part on the at least one motion vector.

12. The method of claim 11, wherein the at least one motion vector specifies a speed of movement and/or a direction of movement of the object entering or exiting a field of view of the first camera, and/or a speed of movement and/or a direction of movement of the object entering or exiting a field of view of the associated camera.

13. The method of claim 11, further comprising determining, by the computing device, a positional relationship between the field of view of the first camera and the field of view of the associated camera based at least in part on the at least one motion vector.

14. The method of claim 1, further comprising, by the computing device, determining at least one of a position of the first object in an image captured by the first camera and a movement path of the first object in the first video feed, and determining the position of the first user interface element based at least in part on the position and/or the movement path of the first object.

15. The method of claim 2, further comprising determining, by the computing device, a positional relationship between the first camera and the associated camera based on the location information, wherein the position of the first user interface element and/or the position of the second user interface element is determined based at least in part on the positional relationship.

16. The method of claim 1, further comprising determining, by the computing device, a time interval between the identification of the object in the first video feed and the re-identification of the object in the video feed captured by the associated camera, and generating the first configuration settings based at least in part on the time interval.

17. The method of claim 1, further comprising:

at a client device displaying video from the first camera in the display area of the graphical user interface, prompting a user to confirm whether the first user interface element is to be displayed in the display area; and storing a result of the confirmation.

18. The method of claim 1, further comprising:

determining, by the computing device, a position of at least one further user interface element configured to be displayed in the display area when the display area displays video from the first camera; and specifying the position of the first user interface element such that the first user interface element does not overlap the at least one further user interface element.

19. The method of claim 1, comprising:

determining whether a subsequent object, identified in the first video feed, can be re-identified in at least a third video feed captured by a respective at least third camera of the plurality of cameras within a subsequent predetermined time period a subsequent time at which the subsequent object was identified;

when the subsequent object is re-identified in the at least third video feed within the subsequent predetermined time period, associating the at least third camera with the first camera as an associated camera;

generating subsequent configuration settings specifying subsequent attributes of a subsequent user interface element configured to be displayed in a display area of a graphical user interface when the display area displays video from the first camera, the subsequent attributes including a position of the first user interface element in the display area and a reference to the associated camera; and storing the subsequent configuration settings in a memory.

20. A surveillance system comprising:

a plurality of cameras;

a computing device including at least one processor; and a memory having stored thereon program instructions executable by the at least one processor for:

identifying a first object in a first video feed captured by a first camera of the plurality of cameras;

determining a first time at which the first object is captured by the first camera;

determining whether the first object can be re-identified in a second video feed captured by a second camera of the plurality of cameras within a predetermined time period from the first time;

when the first object is re-identified in the second video feed within the predetermined time period, associating the second camera with the first camera as an associated camera;

generating first configuration settings specifying first attributes of a first user interface element configured to be displayed in a display area of a graphical user interface when the display area displays video from the first camera, the first attributes including a position of the first user interface element in the display area and a reference to the associated camera; and storing the first configuration settings in the memory.

21. The system of claim 20, wherein the program instructions are executable by the at least one processor for determining a presence of a new camera added to the plurality of cameras, and, in response to the determination, one of: executing the program instructions of claim 20 to reconfigure the system; and outputting a notification indicating that a reconfiguration of the system should be performed.

22. The system of claim 20, further comprising at least one user interface device, the user interface device able to receive and to display at least one video feed from a subset of the plurality of cameras with the first user interface element using the configuration settings from the memory of the computing device.

* * * * *